United States Patent [19]
Bellows

[11] 4,007,765
[45] Feb. 15, 1977

[54] SHUT OFF AND VENTING SYSTEM FOR A CONDUIT TRANSFER LINE
[76] Inventor: Paul M. Bellows, P.O. Box 511, Battle Ground, Wash. 98604
[22] Filed: Nov. 7, 1975
[21] Appl. No.: 629,778
[52] U.S. Cl. .............................. 141/59; 141/198; 141/302; 137/205; 137/572
[51] Int. Cl.² ........................................ B65B 31/00
[58] Field of Search .......................... 141/192–229, 141/59, 301–306, 94, 95; 137/205, 572

[56] References Cited
UNITED STATES PATENTS

| 2,376,628 | 5/1945 | Shanley | 141/198 |
| 3,621,893 | 11/1971 | Doi et al. | 137/205 |
| 3,706,319 | 12/1972 | Neese et al. | 137/205 |

Primary Examiner—Houston S. Bell, Jr.
Attorney, Agent, or Firm—James D. Givnan, Jr.

[57] ABSTRACT

A transport tank and a spreader tank with a communicating conduit system for the transfer of liquid sludge to the latter tank. A conduit shut off and venting system includes a receptacle into which a first conduit discharges with a remaining flexible conduit segment leading to the spreader tank. The receptacle mounts an air cylinder provided with a piston actuated valve assembly operable to close a receptacle intake port and open a receptacle vent for venting and evacuation of the flexible conduit segment. When oppositely positioned the valve assembly closes the vent for normal fluid transfer. A valve in circuit with a fluid level sensing device controls air cylinder operation.

7 Claims, 3 Drawing Figures

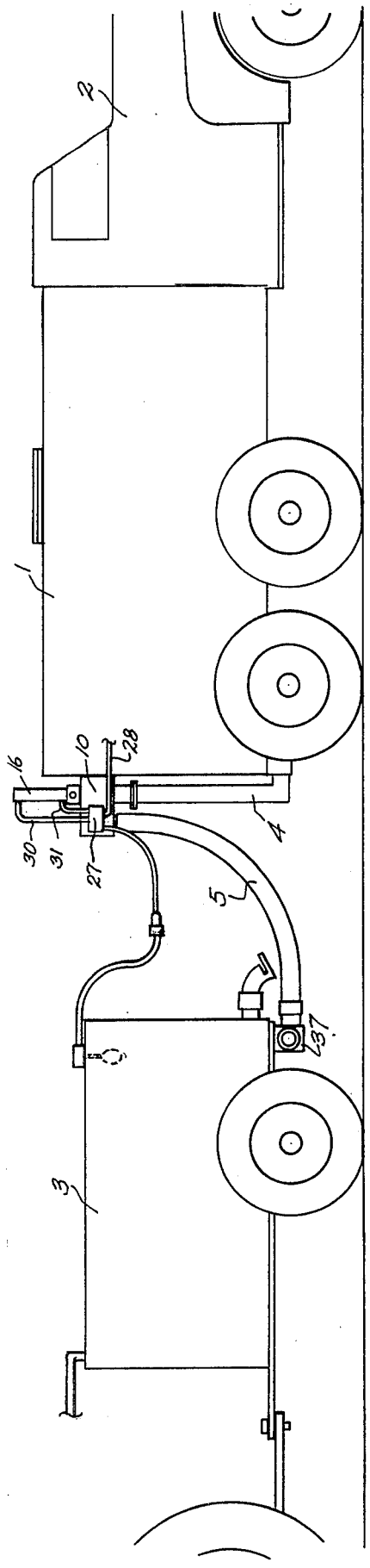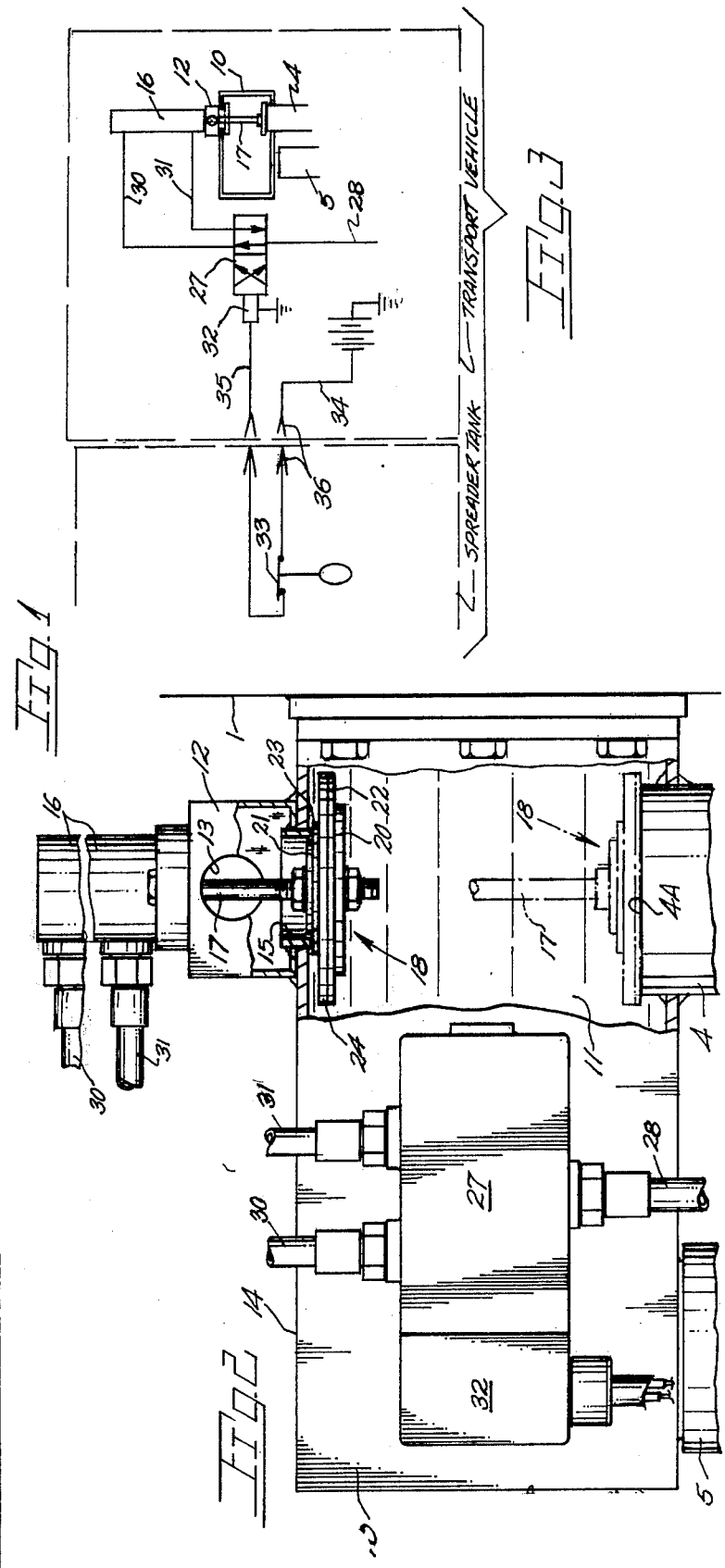

SHUT OFF AND VENTING SYSTEM FOR A CONDUIT TRANSFER LINE

BACKGROUND OF THE INVENTION

The present invention relates generally to a system in combination with a fluid transfer conduit for closing off said conduit and simultaneously venting a remaining conduit segment to prevent spillage of subsequently disconnected conduit members.

Of increasing acceptance is the periodic removal of liquid sludge from sewage treatment facilities, with the sludge being applied to farm land as a fertilizer. In such practice, large transport tanks are loaded at the sewage treatment facility for sludge delivery to farm locations whereat the sludge is transferred to spreader vehicles equipped with a tank of lesser size. For purposes of efficiency and sanitation, the transfer between the large transport tank and the smaller spreader tank must be accomplished in an expeditious manner with no spillage. Large diameter communicating conduits, several inches in diameter, are used to expedite transfer of the liquid sludge. One of said conduits must be vented after completion of sludge transfer to remove a sizable residual amount of sludge to avoid later spillage upon disconnection of the conduits. A further consideration is the timely shutting off of the sludge flow as the lesser sized spreader tank becomes filled to capacity. Toward this end existing transport and spreader tanks are equipped with level sensing devices in circuit with aural warning devices which indicate to the operator tank level and when certain valves are to be actuated. Such arrangements include costly valve components and more significantly rely on the operator to timely operate the valves and other transfer controls in proper sequence.

SUMMARY OF THE PRESENT INVENTION

The present invention is embodied within a shut off and vent system utilized to control flow within a transfer conduit arrangement extending intermediate two fluid quantities.

The present shut off and venting system includes a dual acting valve assembly serving to close off the end of a first conduit while simultaneously admitting vent air to a remaining conduit to permit complete evacuation of fluid from said remaining conduit. The valve assembly is remotely controlled and automatically actuated upon the tank being filled reaching a desired level. Accordingly, both shut off and venting of the conduits are automatic.

Important objectives of the present invention include: the provision of a shut off and venting system for use in a conduit transfer line permitting the simultaneous shutting off of one conduit segment and the venting of a remaining conduit segment to occur automatically upon a fluid tank reaching a desired level; the provision of a shut off and vent arrangement for a large diameter conduit system which permits evacuation of fluid remaining in a conduit segment upon termination of the transfer operation, and; the provision of a shut off and transfer arrangement which does not rely on operator control and hence avoids spillage due to operator error. These as well as other objectives will become subsequently apparent upon an understanding of the following description.

BRIEF DESCRIPTION OF THE DRAWING

In the accompanying drawing,

FIG. 1 is a side elevational view of a transport vehicle and a lesser sized spreader vehicle with a communicating conduit system therebetween and with the present invention shown in operative association with said conduit system.

FIG. 2 is an enlarged detail view with fragments broken away of present shut off and vent system components, and FIG. 3 is a wiring diagram showing a float actuated switch in circuit with a solenoid actuated valve.

DETAILED DESCRIPTION OF THE PREFERRED EMBODIMENT

With continuing reference to the accompanying drawing wherein applied reference numerals indicate parts similarly identified in the following specification, the reference numeral 1 indicates a transport tank on a transport vehicle 2. Transport tank 1 is provided with various accessories to facilitate loading of the tank at a sewage treatment facility, which accessories do not constitute any part of the present invention and accordingly a description of same is therefore unnecessary.

A conduit system extends intermediate transport tank 1 and a spreader tank 3, said conduit system includes a stand pipe 4 and a flexible loading hose 5 constituting first and second conduit segments respectively. Such conduit systems are, generally speaking, well known and heretofore included some type of vent in communication with the highest point of the conduit system extending between the two tanks.

The present invention is embodied within a shut off and venting system including a receptacle 10 having fluid receiving chamber 11. A vent structure 12 defines a vent opening 13 while an upper wall 14 of the receptacle is provided with a ring 15 which defines a vent opening through which atmospheric air may pass.

A pneumatic cylinder 16 having a piston rod 17 is disposed concentrically above ring 15 with the rod provided with a valve assembly indicated generally at 18. Backing plates 20 and 21 of the valve assembly confine lower and upper resilient valve members 22 and member 23 between which is located a main backing plate 24. Resilient valve member 23 seats against the lower periphery of ring 15 to close the vent opening in receptacle wall 14 during conduit carried fluid flow through receptacle 10. In the fluid shut off position, shown in broken lines in FIG. 2, resilient valve fluid member 22 seats downwardly against the discharge end 4A of conduit 4 to prevent further fluid flow into the receptacle and into conduit segment 5.

The valve assembly is positioned by double acting pneumatic cylinder 16 which in turn is controlled via a two position, four way valve structure indicated at 27. Serving said valve is an air supply line 28 in communication with a source of pressurized air such as the vehicle air supply system and which, upon valve operation, may alternately supply air lines at 30 and 31 with pressurized air. A solenoid at 32, integral with valve structure 27, is in circuit with a normally closed float actuated switch 33 located on spreader tank 3 which switch, upon the spreader tank being loaded to a desired level, opens an electrical circuit to solenoid 32. An electrical circuit includes a lead 34, switch 33, a second lead 35 and a disconnect 36.

Fluid flow is terminated upon valve assembly 18 moving to the FIG. 2 broken line position resulting in remaining conduit segment 5 being vented via vent openings 13 and ring 15. Conduit segment 5 is evacuated by reason of residual fluid being drawn into the vacuum loaded spreader tank. A valve at 37 is closed upon the contents of flexible conduit 5 being drawn into spreader tank 3. Valve 37 may be either of the automatically actuated type operating in a time delay manner so as to close after evacuation of conduit 5 or manually actuated.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. A shut off and venting system simultaneously stopping fluid flow in one conduit segment and venting a remaining communicating conduit segment of a conduit system extending between two tanks, said shut off and venting system comprising, a fluid receptacle in communication with both conduit segments, said receptacle having a vent and fluid intake and discharge openings, a valve assembly simultaneously closing said vent and opening said intake opening in one position whereby fluid is communicated from one conduit segment to the remaining conduit segment and in a second position closing the intake opening of the receptacle and opening the vent thereby venting said remaining conduit segment, switch means actuated upon the level of a tank being filled by the conduit system reaching a desired height, and valve means in circuit with said switch means and operable to control a pressure responsive motor actuating said valve assembly whereby said assembly is positioned automatically.

2. The system claimed in claim 1 wherein said intake opening and said vent are oppositely disposed on said receptacle.

3. The system claimed in claim 2 wherein said receptacle serves to mount said pressure responsive motor in axial alignment with said vent and intake opening.

4. The system claimed in claim 3 additionally including vent structure interposed between said receptacle and the pressure responsive motor.

5. The system as claimed in claim 1 wherein said valve assembly includes upper and lower resilient members for closure of said vent and said intake opening in an alternate manner.

6. The system as claimed in claim 5 wherein said receptacle includes a ring member defining said vent and also constituting a valve seat for said upper resilient member of the valve assembly.

7. The system as claimed in claim 1 wherein said receptacle is located at the highest point along the conduit system.

* * * * *